United States Patent Office 3,001,967
Patented Sept. 26, 1961

3,001,967
METHOD OF COPOLYMERIZING POLYESTER, ETHYLENICALLY UNSATURATED MONOMER AND METAL SALT OF ACID HALF ESTER OF ALPHA, BETA-ETHYLENICALLY UNSATURATED DICARBOXYLIC ACID AND A MONOHYDRIC ALCOHOL AND COPOLYMERS THEREOF
Herbert Willersinn, Ludwigshafen (Rhine), Germany, assignor to Badische Anilin- & Soda-Fabrik Aktiengesellschaft, Ludwigshafen (Rhine), Germany
No Drawing. Filed Aug. 19, 1958, Ser. No. 755,858
Claims priority, application Germany Aug. 27, 1957
5 Claims. (Cl. 260—45.4)

This invention relates to a process for the production of new copolymers by copolymerizing unsaturated polyesters with compounds containing the group $CH_2=C<$ and metal salts of acid half esters of dicarboxylic acids.

It is known to prepare polymers which are stable to solvents and water by copolymerizing metal salts of alkyl half esters of unsaturated dicarboxylic acids with vinyl or vinylidene compounds.

It is also known that the polymerization of polyester resins catalyzed by peroxides can be accelerated by small amounts of salts of polyvalent metals of acid half esters of alpha.beta-unsaturated dicarboxylic acids in which the metal is present in a reduced valency stage.

I have now found that copolymers with especially valuable properties are obtained by copolymerizing in bulk an unsaturated polyester with one or more other unsaturated monomeric polymerizable compounds containing the group $CH_2=C<$ and with a salt of metals of the groups IB, IIA, IIB of IIIA of the periodic system of acid half esters of alpha.beta-unsaturated dicarboxylic acids in which the metal is present in its highest valency stage.

As metal components in the salts there may serve all polyvalent metals in their maximum valency stage from the above groups of the periodic system of elements which give with the acid half esters of alpha.beta-unsaturated dicarboxylic acids, metal salts which are soluble in the polymerizable mixtures, as for example beryllium, magnesium, calcium, strontium, barium, aluminum, copper, silver, zinc, cadmium and mercury.

As acid components of the acid half esters of alpha.beta-unsaturated dicarboxylic acids the following are suitable for example: maleic acid, fumaric acid, itaconic acid, mesaconic acid and citraconic acid.

The alcoholic components of the acid half esters may be monohydric, saturated, straight-chained or branched aliphatic, cycloaliphatic or araliphatic primary or secondary alcohols with preferably 1 to 18 carbon atoms. The alcohols may also be ethoxylated.

Suitable alcohols are for example normal propanol, isopropanol, normal butanol, alpha-ethylhexanol, cyclohexanol, methylcyclohexanol, benzyl alcohol, phenyl ethyl alcohol, ethylene glycol monobutyl ether or ethylene glycol monophenyl ether and the like.

The higher alcohols, for example alpha-ethylhexanol or other branched alcohols with 8 or more carbon atoms, impart to the polyvalent metal salts of the acid half esters, especially good solubility properties. The metal salts may also be used in admixture with each other, and both the acid or alcohol component and the metal components may be different.

By unsaturated polyesters I mean polycondensation products of alpha.beta-unsaturated dicarboxylic acids with polyhydric alcohols, preferably dihydric alcohols. These polyesters may be prepared for example from maleic acid or fumaric acid, itaconic acid, mesaconic acid, citraconic acid and the like with diols and other polyhydric alcohols, as for example ethylene glycol, propane-diol, butene-diol, butane-diol, hexane-diol, 2.2-dimethylpropane-diol or similar compounds which may also be substituted. A part of the unsaturated dicarboxylic acids may be replaced by saturated dicarboxylic acids, as for example succinic acid, glutaric acid, alpha-methylglutaric acid, adipic acid, pimelic acid, or by phthalic acid, isophthalic acid, terephthalic acid, endomethylenetetrahydrophthalic acid or their substitution products, as for example tetrachlorphthalic acid and the like.

Suitable unsaturated, monomeric polymerizable compounds, containing the group $CH_2=C<$ which can be copolymerized with the unsaturated polyesters and the metal salts of the acid half esters of alpha.beta-unsaturated dicarboxylic acids are vinyl or alkyl compounds, for example vinylaromatics, such as styrene, halogenated styrenes, divinylbenzene, vinyltoluene, vinylnaphthalene and also vinyl esters, such as vinyl acetate, vinyl propionate, divinyl succinate, vinylsulfones, such as divinylsulfone, ethylvinylsulfone, N-vinyl compounds, such as N-vinylcarbazole, N-vinylpyrrolidone, N-vinylcaprolactam, N-vinylcaprylic lactam, vinyl ethers, such as butyl vinyl ether, butane-diol divinylether, unsaturated carboxylic acids and their derivatives, such as acrylic acid, acrylic esters, acrylamide, acrylonitrile, alpha-chloroacrylic ester, methacrylic acid and its corresponding derivatives, allyl esters, such as allyl acetate, allyl acrylate, allyl methacrylate, diallyl maleate, diallyl phthalate, diallyl terephthalate, diallyl endomethylenetetrahydrophthalate, allyl ethers, such as diallyl ether, glycol diallyl ether, pentaerythritol tetra-allyl ether or the tetra-allyl ether of tetramethylol-acetylene-diurea.

Mixtures of different metal salts with mixtures of different polymerizable compounds may also be copolymerized. Thus for example a polymerizable mixture may consist of styrene, a polyfunctional allyl ether, an unsaturated polyester and the aluminum salt of mono-alpha-ethylhexyl maleate.

The polymerizable mixtures may consist of 10 to 90%, preferably 25 to 75%, of unsaturated polyester, 90 to 10%, preferably 75 to 25%, of polymerizable monomeric compound and 0.1 to 40%, preferably 1 to 30%, of polymerizable metal soap.

When the mixture is to be used as a lacquer, it may contain small amounts of an aromatic indifferent solvent, i.e. about 5 to 20% with reference to the weight of the whole mixture. Suitable solvents include benzene or toluene and the like.

As polymerization catalysts there may be used all radical-forming compounds, especially per-compounds or azo compounds, and also light, especially ultraviolet light. Suitable peroxides are for example peracids, such as perbenzoic acid, perlauric acid and the like, diacyl peroxides, such as benzoyl peroxide, lauroyl peroxide and the like, dialkyl peroxides, such as ditertiary butyl peroxide, 2.2'-ditertiary butyl peroxide butane and the like, hydroperoxides, such as tertiary butyl hydroperoxide, cumene hydroperoxide, cyclohexane hydroperoxide and the like, ketone peroxides, such as the various cyclohexanone peroxides, methyl ethyl ketone peroxide and the like, and other per-compounds, such as tertiary butyl perbenzoate, tertiary butyl permaleate, ascaridol and the like. The peroxides may be activated by the co-employment of activators, such as heavy metal driers, amines, phosphines and the like or may be constituents of other redox systems. Suitable azo compounds are for example azodiisobutyronitrile, azodi-isobutyric acid diethyl ester and the like. It is also possible to use mixtures of different catalysts.

The mixtures of unsaturated polyesters with polymerizable monomeric compounds hitherto known, which are usually called unsaturated polyester resins, may be used under suitable conditions as lacquers. Especially those mixtures which contain allyl ether groups either in the monomeric component and/or in the polyester component, are suitable as lacquers. While it is true that the lacquer layers prepared therefrom are hard and non-sticky, they often have an undesirable irregular surface. On the other hand if unsaturated polyester resins are used which according to this invention contain one of the said unsaturated salts (usually even small amounts, of about 0.3 to 1%, are sufficient), highly lustrous lacquer films with an unobjectionable surface are obtained. The aluminum salt of mono-alpha-hexyl maleate has proved good for this purpose. There exists a desire to convert unsaturated polyester resins into a gelatinous state without polymerization. Such pregelled products would be desirable for example when applying to an inclined surface in order to prevent or retard the same from running down. Advantages are also offered in polyester pressing compositions, glass fiber laminates and the like. This desire could not be fulfilled in a satisfactory way by the polyester resins hitherto known.

Such non-polymerized polyester resin gels, however, may now by prepared with the aid of the said polyvalent metal salts. For example, if a liquid 65% solution of the aluminum salt of mono-alpha-ethylhexyl maleate in styrene is mixed with a liquid unsaturated polyester resin (mixture of 60% of an unsaturated polyester and 40% of styrene), the mixture begins to solidify to a gel after a short time. If the gels contain suitable polymerization catalysts then, after they have been shaped or the like, they polymerize to solid, insoluble and infusible articles. The gelatinizing agent, i.e. the aluminum salt, is polymerized into the end product.

Unsaturated polyester resins which contain the said unsaturated salts of mercury, copper and the like, are especially suitable for the production of boat bodies, bottom and finishing coats for ships and the like, because the polymerized-in metal salts give the resin fungus- and algae-repelling properties.

The process according to the present invention can only be carried out with practical success with the said metal salts in which the metals are present in the highest valency stage, because these salts do not have any reducing properties. They cannot therefore enter into reciprocal action in the sense of an undesirable redox reaction with the peroxides used in the polymerization. It is thus possible for the first time to use these salts, both in small and in large amounts, in the polymerizable mixtures without the speed of polymerization being altered or the course of the hardening being disturbed.

Thus for example it is directly possible to prepare from the following components a non-polymerized storable mixture of gelatinous consistency: 40% of styrene, 17.5% of the aluminum salt of mono-alpha-ethylhexyl maleate, 42% of an unsaturated polyester from maleic acid and propylene glycol, 0.5% of benzoyl peroxide and 0.01% of hydroquinone. This mixture, which has interest from the point of view of the technique of employment by reason of its peculiar consistency, can be kept unchanged for more than a day at room temperature. After it has been given an appropriate shape, it can be rapidly hardened by heating to 80° to 100° C. If an analogous salt of a metal which is present in a reduced valency stage, for example a ferrous salt, rather than the said aluminum salt, the mixture cannot be worked up at all because it polymerizes within a few minutes even at room temperature.

The circumstances are similar when using the above-specified aluminum soap in air-drying polyester resin lacquers. Thus for example air-drying polyester resins which contain allyl ether groups are stable for months after the addition of 2% of the above-specified aluminum soap to improve the flow. If however there are added to these lacquer polyester resins, analogously constituted heavy metal soaps in which the metal is present in a valency stage which is lower than the highest valency stage of the metal concerned, for example with a cobaltous salt, then a skin forms in a short time under the influence of atmospheric oxygen and finaly polymerization takes place.

The following examples will further illustrate this invention but the invention is not restricted to these examples. The parts specified in the examples are parts by weight.

*Example 1*

The following substances are added consecutively to a running kneader: 370 parts of a liquid unsaturated polyester resin consisting of a mixture of 60% of an unsaturated polyester derived from maleic acid and propylene glycol and 40% of styrene, 10 parts of ditertiary butyl peroxide, 120 parts of a 65% solution of the aluminum salt of mono-alpha-ethylhexyl maleate in styrene and 500 parts of quartz powder. After good, thorough mixing there is obtained a gelatinous, non-sticky paste which can be pressed and polymerized at temperatures of 120° to 150° C. to hard shaped articles which are stable to temperature.

On the other hand if a mixture is prepared from the same unsaturated polyester resin and quartz powder, omitting the aluminum salt, the mixture containing the same proportion of quartz powder as the above mixture (50%), then instead of a gelatinous, non-sticky, solid paste there is obtained a viscous sticky mass which can only be handled with great difficulty.

Instead of the aluminum salt of mon-alpha-ethylhexyl maleate, there may also be used with equally good results the aluminum salt of mono-alpha-ethylhexyl fumarate or the corresponding itaconate.

*Example 2*

2 parts of a 50% paste of cyclohexanone peroxide and 8 parts of a 5% solution of cobalt naphthenate in styrene are added to a mixture of 39 parts of an unsaturated polyester derived from 2 mols of maleic acid, 1 mol of diethylene glycol and 1 mol of 2.2′-dimethylpropane-diol-1.3, 33 parts of tetra-allyl ether of tetramethylolacetylene-diurea, 27 parts of styrene and 3 parts of the aluminum salt of mono-alpha-ethylhexyl maleate. The mixture is brushed onto glass plates and left to lie in the air; a sample is poured into a test tube. The test tube sample begins to polymerize after 10 minutes and is hard and solid after 15 minutes. The glass plate coatings are dust dry after about 3 hours and have a highly lustrous surface which is smooth and trouble-free.

By working with the same mixture but without the aluminum salt, dust dry films are obtained after the same period, but these are not of undisturbed smoothness, but appear pitted.

Instead of the aluminum salt of mono-alpha-ethylhexyl maleate there may be used with the same good result the silver or zinc salt of mono-alpha-ethylhexyl fumarate or the corresponding citraconates.

*Example 3*

20 parts of a solution of 60% of aluminum soap of the maleic half ester of ethylene glycol monobutyl ether and 40% of styrene are added to 80 parts of a liquid polyester resin (viscosity 200 Din seconds, measured in Din beaker No. 40 at 20° C.) derived from an unsaturated polyester of maleic acid and propylene glycol-1.2 (acid number 25) and 40% of styrene, and well mixed. The initially liquid mixture solidifies within half an hour to a gel. The gel formation is not the result of a polymerization process, but constitutes a physical process, because the gel is soluble in organic solvents, for example in benzene.

If 1% of benzoyl peroxide be mixed with the mixture, before or after the gel formation, there is obtained a gelatinous solidified polymerizable mixture which can be polymerized at temperatures of 80° C. to solid and hard articles.

If glass fiber mats or the like are treated with the polymerizable mixture, preferably prior to the onset of the gelatinization effct, mats are obtained from which the resin does not drip off or run out in storage. These mats can be polymerized, for example at 80° C. in a press, to produce shaped structures.

Practically the same results are achieved by using instead of the aluminum soap of the maleic acid half ester of ethylene glycol monobutyl ether used above, the aluminum soaps of the following half esters: ethylene glycol monocyclohexyl ether maleate, ethylene glycol monophenyl ether maleate, normal propyl maleate, normal butyl maleate, isopropyl maleate, cyclohexyl maleate, methylcyclohexyl maleate, benzyl maleate, phenylethyl maleate, phenylethylfumarate or of aluminum soaps of maleic acid half esters of mixtures consisting of ethyl hexanol and methanol in a molar proportion of 80:20 or of a mixture of maleic acid half esters of α-ethyl hexanol and stearyl alcohol in a molar proportion of 85:15.

*Example 4*

5 parts of a soap solution of 60% of the aluminum soap of the maleic half ester of 2-ethylhexanol and 40% of styrene, and also 2% of lauroyl peroxide, are added to 94 parts of a liquid polyester resin (viscosity 350 Din seconds, measured in Din beaker No. 4 at 20° C.) derived from 60% of an unsaturated polyester of 4 mols of maleic acid, 3 mols of 2.2′-dimethylpropane-diol-1.3, 1 mol of propylene glycol and 40% of styrene. The mixture solidifies within a few minutes to a non-polymerized gel which can be worked up like that described in Example 3.

*Example 5*

91 parts of the polyester resin (viscosity 200 Din seconds, measured in Din beaker No. 4 at 20° C.) used in Example 3 are mixed with 9 parts of the soap solution (viscosity 15 Din seconds, measured in Din beaker No. 10) used in Example 4. After standing for some time there is obtained a highly viscous solution (viscosity 1000 Din seconds, measured in Din beaker No. 4 at 20° C.) which can be used wherever value is placed on highly viscous polyester resins.

After the addition of 0.5% of cyclohexanone peroxide and 0.2 part of a 10% cobalt naphthenate solution in styrene, the polymerizable mixture can be polymerized at room temperature to hard and strong shaped articles.

*Example 6*

2 parts of a 50% cyclohexanone peroxide paste and 8 parts of a 5% solution of cobalt naphthenate in styrene are added to a mixture of 33 parts of an unsaturated polyester derived from 1 mol of maleic acid and 1 mol of propylene glycol (acid number 26), 28 parts of the tetraallyl ether of tetramethylolacetylene-diurea, 33 parts of styrene and 6 parts of the zinc salt of mono-alpha-ethylhexylmaleate. The mixture is brushed in a thin layer onto glass plates and left lying in the air. The glass plate coatings are dust dry after about 3 hours and have an undisturbed, smooth and highly glossy surface. The same result is obtained by using the same amount of the corresponding calcium salt instead of the zinc salt.

By working up the same mixture but without the said slots however it is true that a dust dry film is also obtained but this has a wrinkled surface and not a smooth one.

What I claim is:

1. In the method of producing copolymers of (1) unsaturated polymerizable polyesters derived from α,β-ethylenically unsaturated dicarboxylic acids and polyhydric alcohols and (2) monomeric ethylenically unsaturated compounds copolymerizable with said polyesters and containing the group $CH_2=C<$ the improvement which comprises copolymerizing with said polyesters and said monomeric compounds from 0.1% to 40% by weight, with respect to the total weight of said polyesters and said monomeric compounds, of a metal salt of an acid half ester of an α,β-ethylenically unsaturated dicarboxylic acid with a monohydric alcohol having the formula

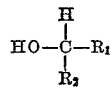

Wherein $R_1$ and $R_2$ are selected from the group consisting of aliphatic, cycloaliphatic, aliphatic-aromatic, aromatic, ethoxylated aliphatic, ethoxylated cycloaliphatic, ethoxylated aliphatic-aromatic, and ethoxylated aromatic hydrocarbon radicals with 1 to 18 carbon atoms, and hydrogen; said metal being selected from the group consisting of beryllium, magnesium, calcium, strontium, barium, aluminum, copper, silver, zinc, cadmium and mercury, said metal also being in its highest valency stage.

2. In the method of producing copolymers of (1) unsaturated polymerizable polyesters derived from α,β-ethylenically unsaturated dicarboxylic acids and polyhydric alcohols and (2) monomeric ethylenically unsaturated compounds copolymerizable with said polyesters and containing the group $CH_2=C<$ the improvement which comprises copolymerizing with said polyester and said monomeric compounds from 1% to 30% by weight, with respect to the total weight of said polyesters and said monomeric compounds, of a metal salt of an acid half ester of an α,β-ethylenically unsaturated dicarboxylic acid with a monohydric alcohol having the formula

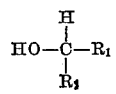

wherein $R_1$ and $R_2$ are selected from the group consisting of aliphatic, cycloaliphatic, aliphatic-aromatic, aromatic, ethoxylated aliphatic, ethoxylated cycloaliphatic, ethoxylated aliphatic-aromatic, and ethoxylated aromatic hydrocarbon radicals with 1 to 18 carbon atoms, and hydrogen; said metal being selected from the group consisting of beryllium, magnesium, calcium, strontium, barium, aluminum, copper, silver, zinc, cadmium and mercury, said metal also being in its highest valency stage.

3. In the method of producing copolymers of (1) unsaturated polymerizable polyesters derived from α,β-ethylenically unsaturated dicarboxylic acids and polyhydric alcohols and (2) monomeric ethylenically unsaturated compounds copolymerizable with said polyesters and containing the group $CH_2=C<$ the improvement which comprises copolymerizing with said polyesters and said monomeric compounds from 1% to 30% by weight, with respect to the total weight of said polyesters and said monomeric compounds, of an aluminum salt of an acid half ester of an α,β-ethylenically unsaturated dicarboxylic acid with a monohydric alcohol having the formula

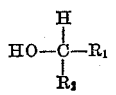

wherein $R_1$ and $R_2$ are selected from the group consisting of aliphatic, cycloaliphatic, aliphatic-aromatic, aromatic, ethoxylated aliphatic, ethoxylated cycloaliphatic, ethoxylated aliphatic-aromatic, and ethoxylated aromatic hydrocarbon radicals with 1 to 18 carbon atoms, and hydrogen; the aluminum being in its highest valency stage.

4. The improvement as claimed in claim 1 wherein the α,β-ethylenically unsaturated dicarboxylic acid of the metal salt of the acid half ester is selected from the group consisting of maleic acid, fumaric acid, itaconic acid, citraconic acid and mesaconic acid.

5. Copolymers obtained by the method set forth in claim 1.

References Cited in the file of this patent

UNITED STATES PATENTS

| | | |
|---|---|---|
| 2,441,799 | D'Alelio | May 18, 1948 |
| 2,642,410 | Hoppens | June 16, 1953 |
| 2,809,183 | Bader et al. | Oct. 8, 1957 |
| 2,813,086 | Robitschek et al. | Nov. 12, 1957 |